April 1, 1924.

G. S. HALE

STRAINER

Filed Aug. 5, 1921

1,488,671

Inventor
George Samuel Hale
By
Attorneys

Patented Apr. 1, 1924.

1,488,671

UNITED STATES PATENT OFFICE.

GEORGE SAMUEL HALE, OF DECATUR, ILLINOIS, ASSIGNOR TO A. W. CASH COMPANY, OF DECATUR, ILLINOIS, A CORPORATION OF DELAWARE.

STRAINER.

Application filed August 5, 1921. Serial No. 490,089.

*To all whom it may concern:*

Be it known that I, GEORGE SAMUEL HALE, a citizen of the United States, residing at Decatur, in the county of Macon and State of Illinois, have invented certain new and useful Improvements in Strainers, of which the following is a specification.

My invention relates to strainers designed for the protection of regulators, meters, valves, pumps, engines, and similar equipment from scale, grit and other foreign matter. One of the particular objects of my invention is to equip the strainer with a screen and a baffle plate, the latter being adapted to protect the screen from the impact of the flow of steam, water, air, oil, or other gases, or liquids, and to hold the screen in place against bulging or distortion.

Figure 1:
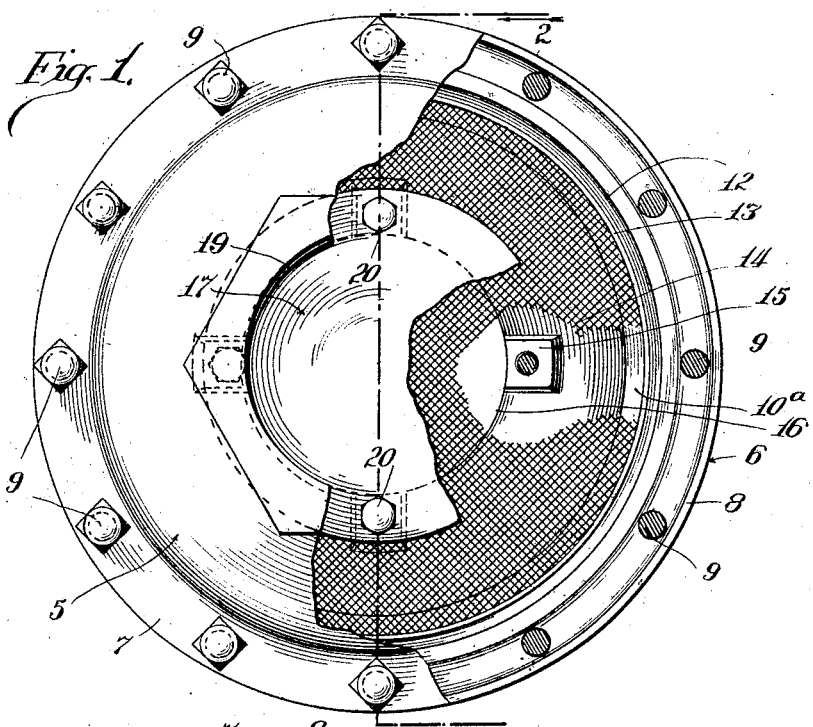
Figure 2:
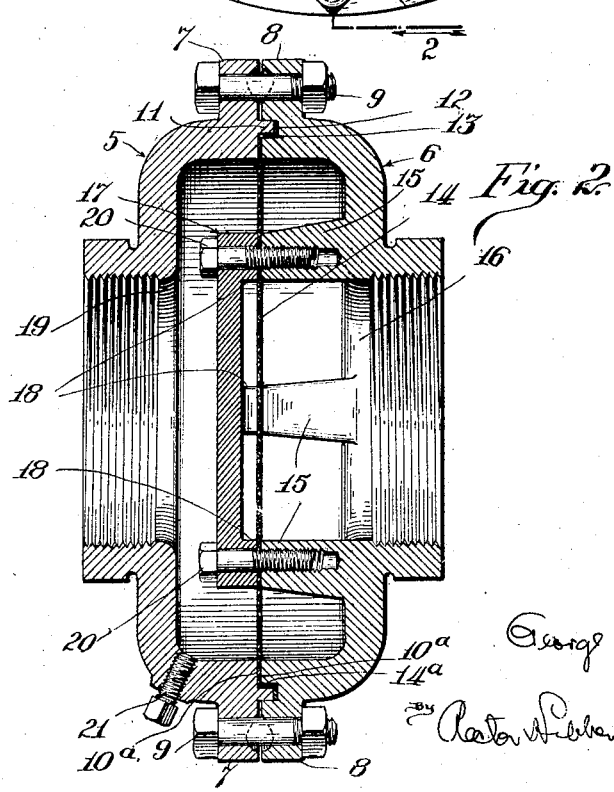

In the drawings, Fig. 1 is an end elevation with part of the casing and part of the baffle plate broken away, showing a strainer embodying my invention; and Fig. 2 is a section on the line 2—2 of Fig. 1.

Throughout the drawings like numerals of reference refer to like parts.

The casing of the strainer comprises the halves or sections 5 and 6, having confronting marginal flanges 7 and 8, respectively, the two sections being connected together by means of bolts 9 projecting through openings in the flanges. The section 5 of the casing is provided with an annular flange or tongue 11 which projects and fits into a corresponding groove 12 in the other section of the casing and a packing ring 13 is confined in the base of the groove to make a perfect tight seal or joint between the sections.

The screen 14, which is preferably of copper and of the desired mesh, is bent adjacent its edge to form a circumferential flange 14ª projecting into the groove 12 and the screen is firmly held between the machined annular surfaces 10ª on the casing sections within the flange 11 and groove 12 and the pressure so exerted on the screen prevents passage of any foreign substances around the edge of the screen. The section 6 of the casing is provided with a plurality of inwardly extending projections 15, preferably four in number, and the ends of the projections contact with the screen 14. The projections 15 are preferably spaced equidistantly about an outlet opening 16 in section 6. A baffle plate 17, which is preferably in the form of a disk and larger than the inlet opening 19 in the casing section 5, is provided with short lugs or bosses 18 which, when the baffle plate is mounted in position, are in juxtaposition with the ends of the projections 15, the screen being positioned and held between the ends of the bosses and projections. The baffle plate 17 is secured in position on the projections 15 by means of cap screws 20 which project through the bosses in baffle plate and openings in the screen and are screwed into the threaded openings in the projections 15. The usual plug 21 is employed for the purpose of cleaning or draining the strainer.

From the foregoing description it will be observed that the edge of the screen is firmly held in position between the machined annular surfaces 10ª of the sections 5 and 6 of the casing. The baffle plate is mounted over the central portion of the screen, and in alignment with the inlet and outlet openings 19 and 16 of the strainer. The gas or liquid, dependent upon the purpose of the system in which the strainer is installed, enters the inlet opening 19 and strikes the baffle plate, the flow thus being diverted around the edge of the baffle plate and through the openings formed by the projections 15 and lugs or bosses 18 and thence out through the outlet opening 16. In this manner the baffle plate takes the impact of the flow of the liquid or gas and at the same time the screen is held firmly in position between the ends of the projections 15 and 18 to prevent bulging or distortion of the screen. The sediment, formed of scale, grit or other solid particles, settles to the bottom of the strainer or is deposited on the screen as the fluid passes through the latter.

While I have shown herein my invention applied to a strainer of the flat type, it will be understood that the invention may be applied to strainers of the cylindrical or other types and that many changes in design and in details of construction may be made without departure from the spirit of my invention, hereinafter claimed.

I claim:

1. In a strainer, the combination of a casing having projections, a screen between the inlet and outlet openings of the strainer and contacting with the ends of said projections, and a baffle plate in alignment with the inlet opening and mounted on said projections.

2. In a strainer, the combination of a casing having projections, a screen between the inlet and outlet openings of the strainer and contacting with the ends of said projections, and a baffle plate in alignment with the inlet opening and mounted on said projections in spaced relation to said screen.

3. In a strainer, the combination of a casing formed in sections, a screen held at its edge between said sections, projections on one of said sections, a baffle plate, and means for mounting said baffle plate on said projections with the screen between the projections and the plate.

4. In a strainer, the combination of a casing formed in sections, a screen held at its edge between said sections, projections on one of said sections, a baffle plate having lugs and means for mounting said baffle plate on said projections with the screen between the projections and lugs.

5. In a strainer, a casing having a broad central chamber with inlet and outlet openings of smaller diameter at opposite sides thereof, a screen of flexible material spanning the central chamber and secured at the edges thereof, a baffle disc in alignment with, and larger than, the inlet opening arranged on the inlet side of said screen and provided with spaced projections extending toward and bearing against the screen, and, on the outlet side of the screen and bearing against said screen, spaced projections carried by the casing, said projections on opposite sides of the screen holding it in place against distortion.

6. Structure as set forth in claim 5 wherein the two sets of projections on opposite sides of the screen are in register, combined with fastening means passing through said screen and uniting said projections.

7. Structure as set forth in claim 6 wherein the two sets of projections extend parallel with the axis of the casing, the projections carried by the casing on the outlet side of the screen being slender posts projecting from the casing wall contiguous to the outlet opening.

GEORGE SAMUEL HALE.